(12) United States Patent
Eng (10) Patent No.: US 11,469,701 B2
(45) Date of Patent: Oct. 11, 2022

(54) TECHNOLOGIES FOR ADAPTIVE MULTI-PULSE COMMUTATION FOR BRUSHLESS DIRECT CURRENT MOTORS

(71) Applicant: ebm-papst Inc., Farmington, CT (US)

(72) Inventor: Hogan Eng, Woodbury, CT (US)

(73) Assignee: ebm-papst Inc., Farmington, CT (US)

( * ) Notice: Subject to any disclaimer, the term of this patent is extended or adjusted under 35 U.S.C. 154(b) by 51 days.

(21) Appl. No.: 17/182,607

(22) Filed: Feb. 23, 2021

(65) Prior Publication Data

US 2021/0297029 A1 Sep. 23, 2021

Related U.S. Application Data

(60) Provisional application No. 62/991,127, filed on Mar. 18, 2020.

(51) Int. Cl.
*H02P 27/08* (2006.01)
*H02P 1/16* (2006.01)
*H02P 6/16* (2016.01)
*H02P 23/14* (2006.01)

(52) U.S. Cl.
CPC ............. *H02P 27/08* (2013.01); *H02P 1/16* (2013.01); *H02P 6/16* (2013.01); *H02P 23/14* (2013.01)

(58) Field of Classification Search
CPC ...... H02P 1/00; H02P 1/04; H02P 1/12; H02P 1/16; H02P 1/163; H02P 1/18; H02P 1/22; H02P 1/24; H02P 1/26; H02P 1/28; H02P 1/32; H02P 1/38; H02P 1/40; H02P 1/423; H02P 1/46; H02P 1/465; H02P 3/00; H02P 3/025; H02P 3/08; H02P 3/18; H02P 3/24; H02P 4/00; H02P 5/00; H02P 6/00; H02P 6/005; H02P 6/07; H02P 6/04; H02P 6/08; H02P 6/12; H02P 6/14; H02P 6/16; H02P 6/26; H02P 6/28; H02P 6/30; H02P 7/00; H02P 7/12; H02P 7/04; H02P 7/14; H02P 7/282; H02P 7/29; H02P 7/298; H02P 21/00; H02P 23/00; H02P 25/00; H02P 29/00; H02P 27/00; H02P 27/04; H02P 27/06; H02P 27/08

See application file for complete search history.

(56) References Cited

U.S. PATENT DOCUMENTS 5,289,089 A 2/1994 Aoki
5,717,298 A * 2/1998 Tang ................. H02P 6/20
                                                318/431
2011/0260669 A1 10/2011 Nakahata
2013/0043818 A1 2/2013 Chang

OTHER PUBLICATIONS

Extended European Search Report for EP21162762.5 dated Oct. 14, 2021, EBM-101 EP II , 6 pages.

* cited by examiner

*Primary Examiner* — Antony M Paul
(74) *Attorney, Agent, or Firm* — Barnes & Thornburg LLP (57) ABSTRACT

A control system includes a motor controller coupled to a brushless direct current motor. The motor controller determines a first start time and a first duration for a first pulse and a second start time and a second duration for a second pulse relative to a commutation cycle of the motor. The motor controller energizes a winding of the motor with the first pulse and the second pulse within the commutation cycle.

20 Claims, 6 Drawing Sheets

TECHNOLOGIES FOR ADAPTIVE MULTI-PULSE COMMUTATION FOR BRUSHLESS DIRECT CURRENT MOTORS

PRIORITY CLAIM

This application claims priority under 35 U.S.C. § 119(e) to U.S. Provisional Application Ser. No. 62/991,127, filed Mar. 18, 2020, which is expressly incorporated by reference herein.

BACKGROUND

The present disclosure relates to electronic motor control. More particularly, the present disclosure relates to adaptive multi-pulse commutation for brushless direct current (DC) motors.

To speed control a brushless DC motor, voltage is applied to the winding and commutated such that the stator poles of the motor pull and push rotor magnets to create rotation. Typically, commutation may be performed with pulse width modulation (PWM) or with a single pulse per commutation cycle.

SUMMARY

According to one aspect of the disclosure, a motor controller for controlling a brushless direct current motor includes a commutation monitor to determine a period of a commutation cycle for the brushless direct current motor, a pulse scheduler to determine a first start time and a first duration for a first pulse and a second start time and a second duration for a second pulse, wherein the first start time and the second start time are relative to a start of the commutation cycle, and a driver controller to (i) energize a winding of the brushless direct current motor with the first pulse and the second pulse within the commutation cycle, and (ii) switch a field direction of the winding in response to an end of the commutation cycle.

In illustrative embodiments, to determine the first start time of the first pulse and the second start time of the second pulse comprises to maximize an off time between the first pulse and the second pulse within the commutation cycle. In an embodiment, to maximize the off time comprises to exclude a predetermined decay time at an end of commutation cycle. In an embodiment, to determine the first start time of the first pulse and the second start time of the second pulse comprises to separate the first pulse and the second pulse by a predetermined percentage of the commutation cycle. In an embodiment, to energize the winding of the brushless direct current motor with the first pulse and the second pulse comprises to merge the first pulse and the second pulse.

In illustrative embodiments, to switch the field direction comprises to reverse the field direction of the winding of the brushless direct current motor, wherein the brushless direct current motor comprises a single phase motor. In an embodiment, to switch the field direction comprises to activate a second winding of the brushless direct current motor, wherein the brushless direct current motor comprises a multi-phase motor.

In illustrative embodiments, to determine the period of the commutation cycle comprises to receive position data from a position sensor coupled to the brushless direct current motor and determine a rotational speed of the brushless direct current motor based on the position data.

In illustrative embodiments, the motor controller further includes a startup controller to energize the winding with a pulse having a predetermined length, wait a predetermined time period in response to energizing the winding with the pulse, energize the winding with a pulse having the predetermined length in response to a wait of the predetermined time period, determine whether a rotor pole has been detected based on position data received from a position sensor coupled to the brushless direct current motor, and switch the field direction of the winding in response to a determination that the motor pole has been detected. In an embodiment, the startup controller is further to determine a speed of the brushless direct current motor in response to the determination that the motor pole has been detected, determine whether the speed of the brushless direct current motor exceeds a predetermined minimum speed, and increase the predetermined length of the pulse in response to a determination that the speed does not exceed the predetermined minimum speed.

According to another aspect, a method for controlling a brushless direct current moto includes determining, by a motor controller, a period of a commutation cycle for the brushless direct current motor; determining, by the motor controller, a first start time and a first duration for a first pulse and a second start time and a second duration for a second pulse, wherein the first start time and the second start time are relative to a start of the commutation cycle; energizing, by the motor controller, a winding of the brushless direct current motor with the first pulse and the second pulse within the commutation cycle; and switching, by the motor controller, a field direction of the winding in response to an end of the commutation cycle.

In illustrative embodiments, determining the first start time of the first pulse and the second start time of the second pulse comprises maximizing an off time between the first pulse and the second pulse within the commutation cycle. In an embodiment, determining the first start time of the first pulse and the second start time of the second pulse comprises separating the first pulse and the second pulse by a predetermined percentage of the commutation cycle.

In illustrative embodiments, determining the period of the commutation cycle comprises receiving position data from a position sensor coupled to the brushless direct current motor; and determining a rotational speed of the brushless direct current motor based on the position data.

In illustrative embodiments, the method further includes energizing, by the motor controller, the winding with a pulse having a predetermined length; waiting, by the motor controller, a predetermined time period in response to energizing the winding with the pulse; energizing, by the motor controller, the winding with a pulse having the predetermined length in response to waiting the predetermined time period; determining, by the motor controller, whether a rotor pole has been detected based on position data received from a position sensor coupled to the brushless direct current motor; and switching, by the motor controller, the field direction of the winding in response to determining that the motor pole has been detected.

In illustrative embodiments, one or more non-transitory, computer-readable media include a plurality of instructions that in response to being executed cause a motor controller to determine a period of a commutation cycle for a brushless direct current motor, determine a first start time and a first duration for a first pulse and a second start time and a second duration for a second pulse, wherein the first start time and the second start time are relative to a start of the commutation cycle, energize a winding of the brushless direct current motor with the first pulse and the second pulse within the commutation cycle, and switch a field direction of the winding in response to an end of the commutation cycle.

In illustrative embodiments, to determine the first start time of the first pulse and the second start time of the second pulse comprises to maximize an off time between the first pulse and the second pulse within the commutation cycle. In an embodiment, to determine the first start time of the first pulse and the second start time of the second pulse comprises to separate the first pulse and the second pulse by a predetermined percentage of the commutation cycle.

In illustrative embodiments, to determine the period of the commutation cycle comprises to receive position data from a position sensor coupled to the brushless direct current motor and determine a rotational speed of the brushless direct current motor based on the position data.

In illustrative embodiments, the one or more non-transitory, computer-readable media further include a plurality of instructions that in response to being executed cause the motor controller to energize the winding with a pulse having a predetermined length, wait a predetermined time period in response to energizing the winding with the pulse, energize the winding with a pulse having the predetermined length in response to waiting the predetermined time period, determine whether a rotor pole has been detected based on position data received from a position sensor coupled to the brushless direct current motor, and switch the field direction of the winding in response to determining that the motor pole has been detected.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 7:
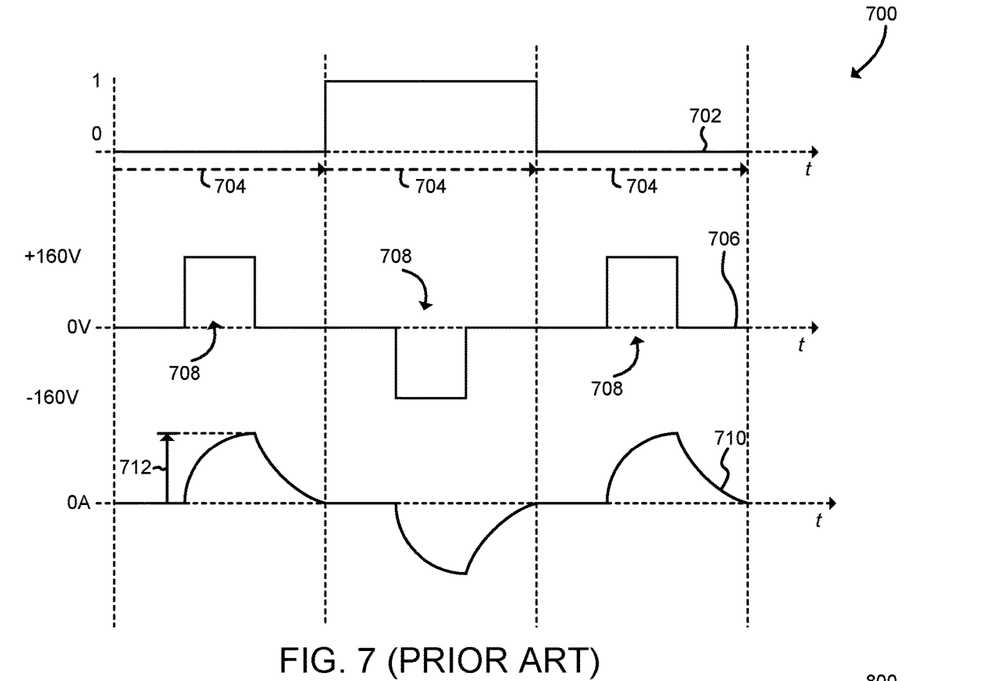
FIGS. 7 and 8 are plots illustrating voltage and current waveforms for typical systems.

Referring now to FIG. 7, typical motor controllers may perform single-pulse motor control for brushless direct current (BLDC) motors, as illustrated in diagram 700. Curve 702 represents Hall effect sensor data indicative of rotor position of a BLDC motor. Curve 702 is illustratively a digital waveform. Edge transitions in the curve 702 represent when the rotor magnets align with stator poles of the BLDC motor (e.g., when a rotor pole passes the Hall effect sensor). As shown, a commutation cycle 704 extends between each edge of the curve 702.

Curve 706 represents voltages applied to the windings of the BLDC motor. As shown, a single pulse 708 is applied to the windings during each commutation cycle 704. The polarity of the pulses 708 is reversed after each commutation cycle 704, for example by switching field direction in the motor windings. Each pulse 708 occurs toward the middle of the respective commutation cycle 704, which allows for motor current to decay before the end of the commutation cycle 704. Curve 710 represents current in the motor windings of the BLDC motor resulting from the applied voltage. As shown, the current increases as the pulses 708 are applied to the motor windings and decays after the pulses 608 have stopped. The current reaches a peak current 712 during the commutation cycle. The peak current 712 is relatively high and may lead to correspondingly high power dissipation and heat production. Additionally, for higher input voltages, current rises at a faster rate and thus may become excessively high, leading to reduced efficiency and potentially reaching the rotor demagnetization current.

Figure 8:
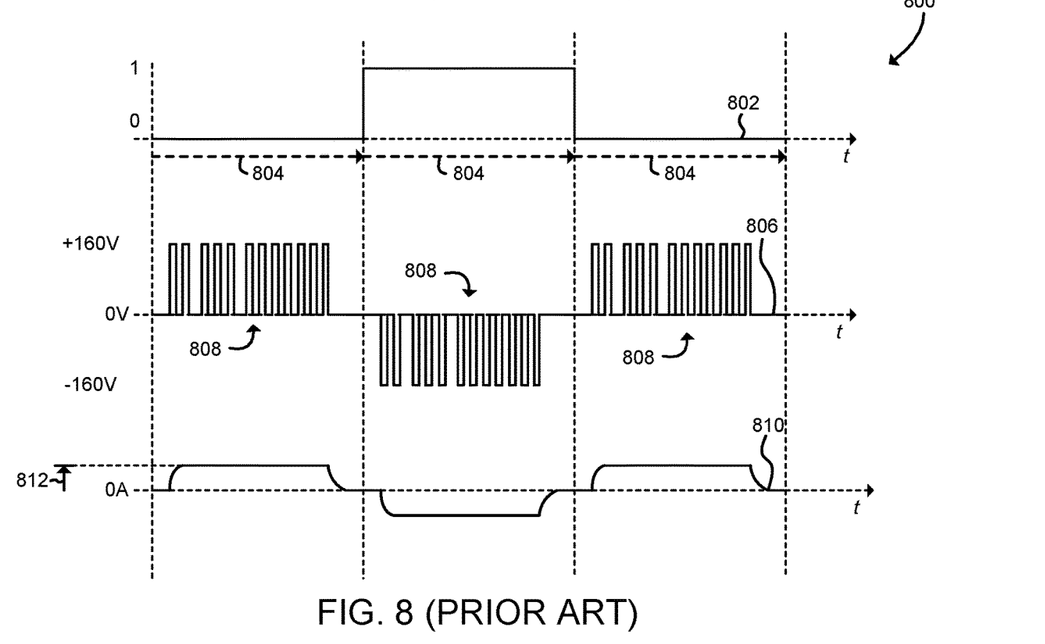

Referring now to FIG. 8, typical motor controllers may also perform pulse width modulation (PWM) motor control for BLDC motors as illustrated in diagram 800. Curve 802 represents Hall effect sensor data indicative of rotor position of a BLDC motor. Similar to the curve 702, the curve 802 is a digital waveform, and edge transitions in the curve 802 represent alignments of rotor magnets with stator poles. A commutation cycle 804 extends between each edge of the curve 802.

Curve 806 represents voltages applied to the windings of the BLDC motor. As shown, a PWM sequence 808 is applied to the windings during each commutation cycle 804. The polarity of the PWM sequence 808 is reversed after each commutation cycle 804, for example by switching field direction in the motor windings. During each PWM sequence 808, the voltage is rapidly switched on and off. The PWM switching frequency is relatively high (e.g., 10 kHz, 15 kHz, 20 kHz, or another frequency) and is independent of the frequency of the commutation cycle 804 (i.e., independent of the present speed of the BLDC motor). Curve 810 represents current in the motor windings of the BLDC motor resulting from the applied voltage. As shown, the current increases as the PWM sequence 808 starts, plateaus during the PWM sequence 808, and decays after the PWM sequence 808 stops. The current reaches a peak current 812 during the commutation cycle. The peak current 812 is relatively low as compared to the peak current 712 of single-pulse control. Thus, PWM control may provide reduced power dissipation and heat production as compared to single-pulse control. However, the higher-frequency switching associated with PWM control may cause unwanted electromagnetic interference (EMI), audible noise, or other unwanted noise. Additionally, higher-frequency switching may increase switching power losses and/or require the use of more expensive components as compared to single-pulse control.

Figure 1:
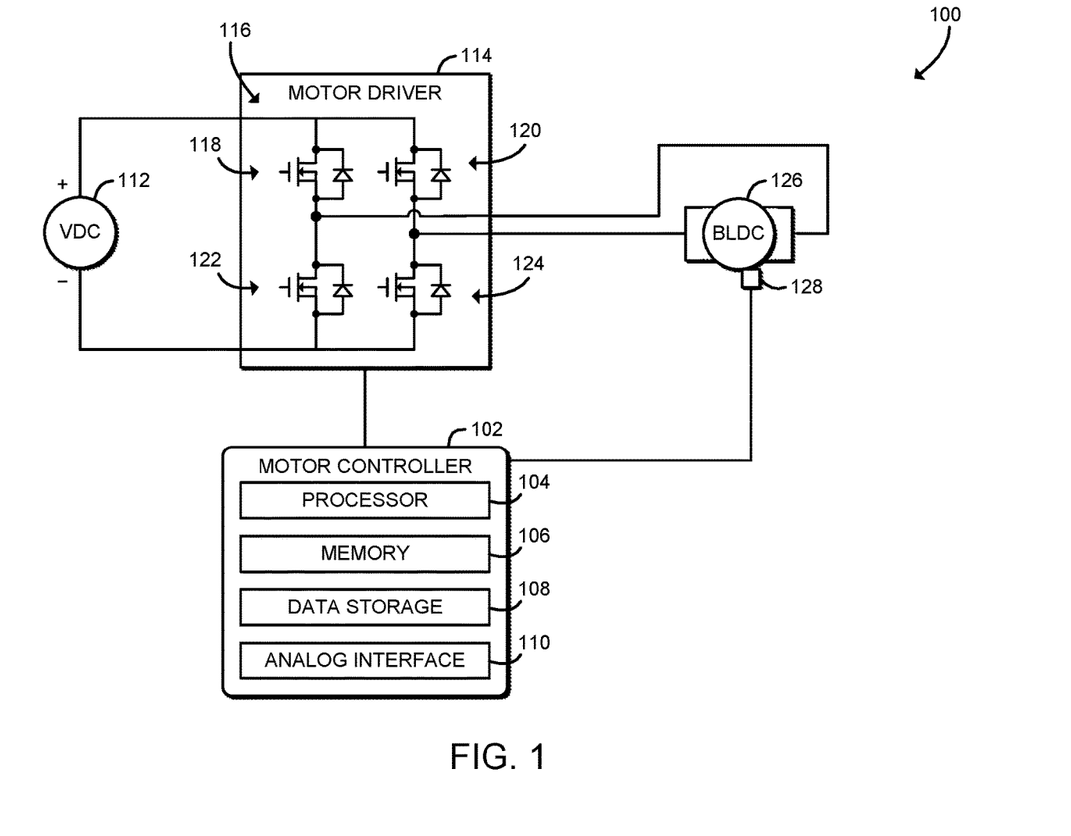
FIG. 1 is a simplified block diagram of a system for controlling a brushless direct current (BLDC) motor.

A motor control system 100 in accordance with the present disclosure is shown in FIG. 1. As shown, the system 100 includes a motor controller 102 coupled to a motor driver 114 and a brushless DC (BLDC) motor 126. In use, as described further below, the motor controller 102 performs adaptive multi-pulse control of the BLDC motor 126 using the motor driver 114. The motor controller 102 and motor driver 114 drive the BLDC motor 126 with multiple pulses per commutation cycle (e.g., two pulses per commutation cycle) and adapt the pulse timing based on motor speed. The adaptive multi-pulse control provided by the motor controller 102 may accommodate a wide operating voltage range with high performance and efficiency. In particular, the system 100 may drive the BLDC motor 126 with lower peak current as compared to single-pulse control, which may reduce current losses (e.g., power dissipation and/or heat production). Additionally, the system 100 drives the motor 126 with a much lower switching frequency as compared to PWM control, and thus the system 100 may reduce switching losses, EMI, audible noise, and other noise as compared to PWM control. For example, an embodiment of the system 100 may use slower transistor turn on and turn off times as compared to PWM control to reduce EMI. As another example, the switching frequency of the system 100 may be below the range of frequencies at which human hearing is most sensitive (e.g., below about 1.5 kHz to 5 kHz), which may reduce perceived audible noise as compared to PWM control. Further, the lower switching frequency of the system 100 may reduce costs as compared to PWM control by enabling the use of less-expensive components.

In an illustrative experiment, the adaptive multi-pulse control of the system 100 disclosed herein was compared to PWM control and single-pulse control for driving the same BLDC motor 126. The experimental system was required to run on 100 VAC to 240 VAC input voltage, with internal full wave rectified voltage for driving the stator winding of the BLDC motor 126 ranging from 140 VDC to 338 VDC. The stator winding for the BLDC motor 126 was optimized for nominal 120 VAC input. In the illustrative experiment, the BLDC motor 126 was driven with 175 VAC input voltage at 2,000 revolutions per minute, with fan blades attached to the BLDC motor 126 as load. Using PWM motor control at a PWM frequency of 1 kHz, the experimental system consumed 26.5 W of power. Using single-pulse motor control (with a pulse peak at 63% of the Hall commutation cycle), the experimental system consumed 31.2 W of power. Using the adaptive multi-pulse control of the system 100 disclosed herein (with two pulse peaks spaced 38% apart with midpoint at 63% of the Hall commutation cycle), the experimental system consumed 26.5 W of power. Thus, the adaptive multi-pulse control disclosed herein may achieve similar power consumption to PWM control using lower cost circuitry, with reduced electromagnetic interference (EMI), and with reduced audible noise as compared to PWM control.

Still referring to FIG. 1, the motor controller 102 may be embodied as a microcontroller, microprocessor, system-on-a-chip (SoC), electronic control unit (ECU), digital signal processor, or other control circuit and related electronics (e.g., analog/digital inputs, signal conditioning stages, amplifiers, and/or other circuitry). The motor controller 102 may be responsible for transmitting control signals to the motor driver 114, receiving sensor signals from the BLDC motor 126, performing motor control routines, and other operations. To do so, the motor controller 102 may include a number of electronic components commonly associated with units utilized in the control of electronic and electromechanical systems. For example, the motor controller 102 may include, amongst other components customarily included in such devices, a processor 104, a memory device 106, and a data storage device 108. The processor 104 may be any type of device capable of executing software or firmware, such as a microcontroller, microprocessor, digital signal processor, or the like. The memory device 106 may be embodied as any type of volatile or non-volatile memory or data storage capable of performing the functions described herein. In operation, the memory device 106 may store various data and software used during operation of the motor controller 102 such as firmware, operating systems, applications, programs, software routines, libraries, and drivers. The data storage device 108 may be embodied as any type of device or devices configured for short-term or long-term storage of data such as, for example, non-transitory, machine-readable media, memory devices and circuits, memory cards, hard disk drives, solid-state drives, non-volatile flash memory, or other data storage devices. Similar to the memory device 106, the data storage device 108 may store various data and software used during operation of the motor controller 102, such as firmware, operating systems, applications, programs, software routines, libraries, and drivers.

The motor controller 102 also includes an analog interface circuit 110, which may be embodied as any electrical circuit(s), component, or collection of components capable of performing the functions described herein. The analog interface circuit 110 may convert signals from the processor 104 into output signals which are suitable for input to the motor driver 114. Similarly, the analog interface circuit 110 may convert input signals (e.g., from the BLDC motor 126) into signals which are suitable for presentation to an input of the processor 104. In particular, the analog interface circuit 110, by use of a network analyzer, an analog-to-digital converter (ADC), or the like, may convert analog signals into digital signals for use by the processor 104. Additionally, although illustrated as separate components, it is contemplated that, in some embodiments, the analog interface circuit 110 (or portions thereof) may be integrated into the processor 104.

As shown, the motor controller 102 is electrically coupled to the motor driver 114. The motor driver 114 is electrically connected to a DC voltage source 112, which may be embodied as a rectifier or other power regulating circuit that supplies DC power to the motor driver 114. Illustratively, the DC voltage source 112 is a DC full-wave rectifier that may provide between 140 VDC to 338 VDC, depending on input AC voltage.

The motor driver 114 is illustratively an H-bridge driver, although in other embodiments the motor driver 114 may be embodied as any driver, pre-driver, multiple half-bridge driver, inverter, or other electrical circuit or collection of circuits capable of driving the BLDC motor 126. As shown, the illustrative motor driver 114 includes multiple switches 116 arranged in an H-bridge configuration. Each of the switches 116 (e.g., the switches 118, 120, 122, 124) is illustrated as a metal-oxide-semiconductor field-effect transistors (MOSFET), but in other embodiments the switches 116 may be embodied as insulated-gate bipolar transistors (IGBTs) or other switching devices. The switches 116 are controllable by the motor controller 102 to apply voltage to output terminals of the motor driver 114. The output terminals of the motor driver 114 are electrically coupled to the BLDC motor 126. The motor driver 114 may also include one or more charge pumps, regulators, or other electronic components to support driving the BLDC motor 126. Additionally, although illustrated as a discrete component, it should be understood that in some embodiments, the functions of the motor driver 114 may be performed by one or more separate electrical components and/or may be integrated in one or more components of the system 100. For example, in some embodiments, the motor driver 114 may be integrated with the motor controller 102.

The BLDC motor 126 is a single-phase brushless DC motor. The BLDC motor 126 includes a stator winding coupled to the motor driver 114 and a rotor that includes one or more permanent magnets. The BLDC motor 126 further includes or is coupled to a position sensor 128. The position sensor 128 generates a signal or other sensor data that indicates the rotational position of the rotor within the BLDC motor 126. The position sensor 128 is illustratively a Hall effect sensor, although in other embodiments the position sensor 128 may be embodied as an encoder or other rotational position sensor. The BLDC motor 126 may include two or more poles, and the position sensor 128 may detect when a pole of the rotor passes by the sensor 128.

Although illustrated as including a single-phase motor 126, it should be understood that in some embodiments the system 100 may include a multiple-phase motor (e.g., a three-phase brushless DC motor). In those embodiments, the motor driver 114 may include additional output terminals and/or output phases for driving the multi-phase motor. Each phase of the multi-phase motor may be energized sequentially as described further below.

Figure 2:
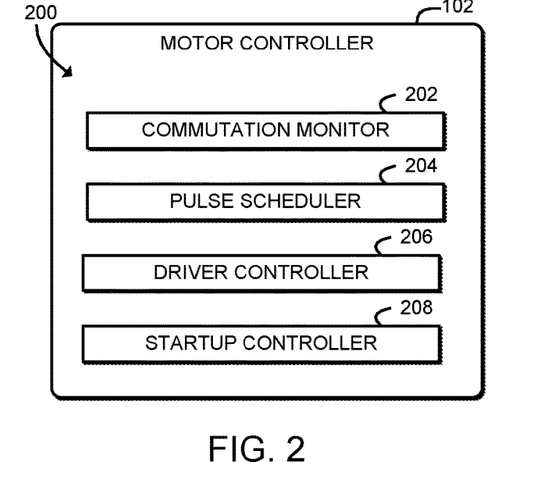
FIG. 2 is a simplified block diagram of at least one embodiment of an environment that may be established by a motor controller of the system of FIG. 1.

In one illustrative example, the motor controller 102 establishes an environment 200 during operation as shown in FIG. 2. The illustrative environment 200 includes a commutation monitor 202, a pulse scheduler 204, a driver controller 206, and a startup controller 208. The various components of the environment 200 may be embodied as hardware, firmware, software, or a combination thereof. As such, in some embodiments, one or more of the components of the environment 200 may be embodied as circuitry or collection of electrical devices (e.g., commutation monitor circuitry 202, pulse scheduler circuitry 204, driver controller circuitry 206, and/or startup controller circuitry 208). It should be appreciated that, in such embodiments, one or more of the commutation monitor circuitry 202, the pulse scheduler circuitry 204, the driver controller circuitry 206 and/or the startup controller circuitry 208 may form a portion of one or more of the motor controller 102, the motor driver 114, and/or other components of system 100. Additionally, in some example, one or more of the illustrative components may form a portion of another component and/or one or more of the illustrative components may be independent of one another.

The commutation monitor 202 is configured to determine a period of a commutation cycle for the BLDC motor 126. Determining the period of the commutation cycle may include receiving position data from the position sensor 128 coupled to the BLDC motor 126 and determining a rotational speed of the BLDC motor 126 based on the position data. As discussed above, the position sensor 128 may be embodied as a Hall effect sensor.

The pulse scheduler 204 is configured to determine a start time and a duration for two pulses. The start times for each of the pulses are relative to the start of the commutation cycle. The durations for each of the pulses may be determined based on a target motor duty cycle. In some embodiments, determining the start times of each pulse may include maximizing an off time between the pulses within the commutation cycle, or separating the pulses by a predetermined percentage of the commutation cycle. A predetermined decay time at an end of commutation cycle may be excluded.

The driver controller 206 is configured to energize a winding of the BLDC motor 126 with both pulses within the commutation cycle. Energizing the winding may include applying a voltage to the winding at the start time for the duration associated with each of the pulses. Applying the voltage may include activating a plurality of switches of an H-bridge circuit coupled to the winding. In some embodiments, energizing the winding with both pulses may include merging the pulses (e.g., for full power operation). The driver controller 206 is further configured to switch a field direction of the winding in response to an end of the commutation cycle. Switching the field direction may include reversing the field direction of the winding of the BLDC motor 126, wherein the BLDC motor 126 is a single phase motor. In some embodiments, switching the field direction may include activating an additional winding of the BLDC motor 126, wherein the BLDC motor 126 is a multi-phase motor.

The startup controller 208 is configured to energize the winding with pulses having a predetermined length and to wait a predetermined time period between energizing the winding with each pulse. The startup controller 208 is further configured to determine whether a rotor pole has been detected based on position data received from the position sensor 128 coupled to the BLDC motor 126, and to switch the field direction of the winding in response to determining that the motor pole has been detected. The startup controller 208 may be further configured to determine a speed of the BLDC motor 126 in response to determining that the motor pole has been detected, determine whether the speed of the BLDC motor 126 exceeds a predetermined minimum speed, and increase the predetermined length of each of the pulses in response to determining that the speed does not exceed the predetermined minimum.

Figure 3:
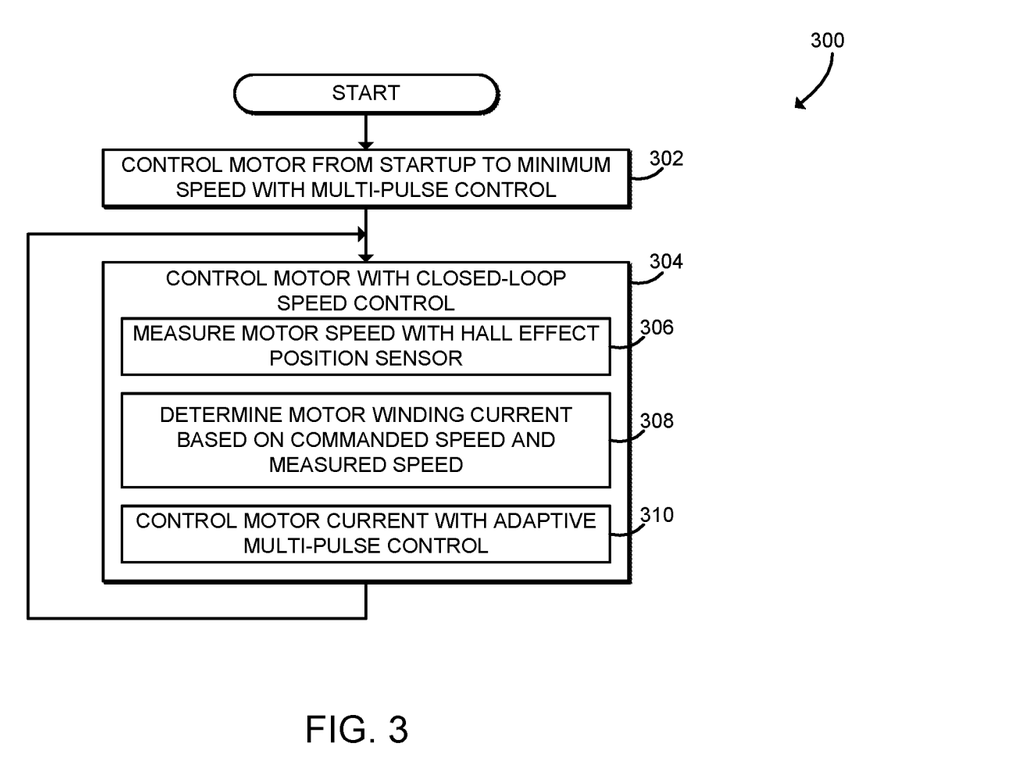
FIG. 3 is a simplified flow diagram of at least one embodiment of a method for brushless DC motor control that may be executed by the motor controller of FIGS. 1-2.

Referring now to FIG. 3, an illustrative embodiment of a method 300 for brushless DC motor control is shown as a simplified flow diagram. The method 300 may be executed by the motor controller 102 (in conjunction with the motor driver 114). The method 300 starts in block 302, in which the motor controller 102 controls the BLDC motor 126 from startup to a predetermined minimum speed using multi-pulse control. The motor controller 102 may perform a motor control operation as described below in connection with FIG. 4.

After the BLDC motor 126 reaches the predetermined minimum speed, the method 300 advances to block 304, in which the motor controller 102 controls the BLDC motor 126 with closed-loop speed control. In block 306, the motor controller 102 measures the rotational speed of the BLDC motor 126 using the Hall effect position sensor 128. In block 308, the motor controller 102 determines a target motor winding current based on a commanded speed and the speed measured in block 306. The motor controller 102 may use any closed-loop control algorithm to determine the target winding current (e.g., proportional-derivative (PD), proportional-integral-derivative (PID), etc.). In block 310, the motor controller 102 controls the motor current using adaptive multi-pulse control. The motor controller 102 may perform a motor control operation as described below in connection with FIG. 5. After controlling the BLDC motor 126, the method 300 loops back to block 304 to continue performing closed-loop motor control.

Figure 4:
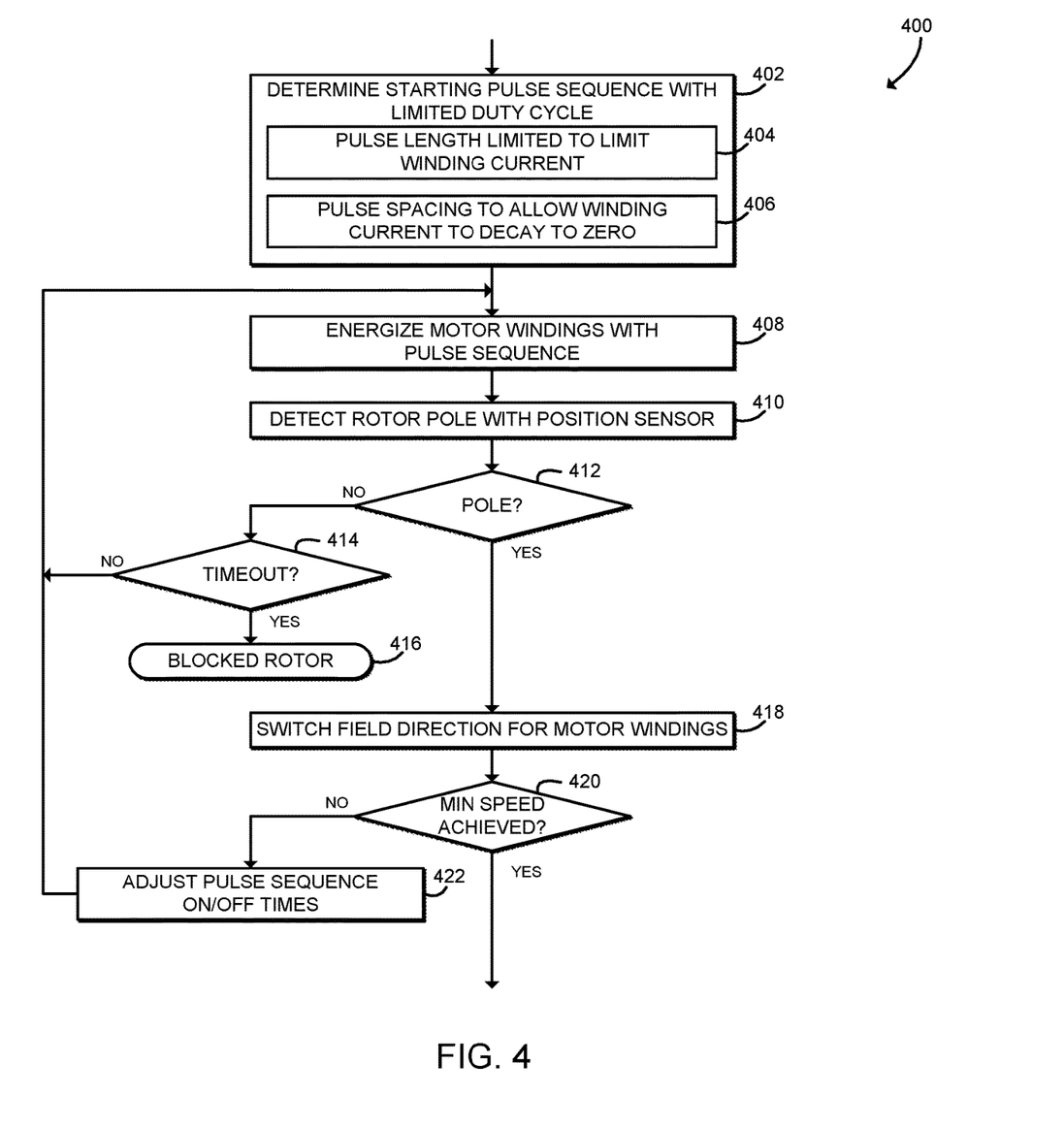
FIG. 4 is a simplified flow diagram of at least one embodiment of a method for motor startup that may be executed by the motor controller of FIGS. 1-2.

Referring now to FIG. 4, an illustrative embodiment of a method 400 for motor startup is shown as a simplified flow diagram. The method 400 may be executed by the motor controller 102 (in conjunction with the motor driver 114). The method 400 starts in block 402, in which the motor controller determines a starting pulse sequence with a limited duty cycle. The limited duty cycle may allow the BLDC motor 126 to start smoothly without generating large or potentially damaging currents in the motor windings. The pulse sequence may include a series of pulses with the same duration, separated by a delay time. In block 404, the motor controller 102 limits the pulse length to limit current in the motor windings of the BLDC motor 126. For example, the motor controller 102 may limit the pulse length such that the worst case high voltage supply current peak generated by the pulse remains below a demagnetization current for the rotor magnets of the BLDC motor 126. In block 406, the motor controller 102 determines the delay time separating the pulses that allows the winding current to decay back to zero.

In block 408, the motor controller 102 energizes the windings of the BLDC motor 126 with a sequence of pulses as determined in block 402. The motor controller 102 may energize the motor windings by operating one or more switches 116 of the motor driver 114 to apply a voltage to the motor windings. For example, the motor controller 102 may close the switches 118, 124 to apply a positive voltage to the BLDC motor 126, and the motor controller 102 may close the switches 120, 122 to apply a negative voltage to the BLDC motor 126. The motor controller 102 may close the appropriate switches according to the duration of each pulse and the delay time between pulses.

In block 410, the motor controller 102 detects a rotor pole with the position sensor 128. During startup or at low speed, the rotor may move relatively slowly and thus a relatively long amount of time may elapse between detection of rotor poles. The motor controller 102 may determine whether the rotor pole is detected based on sensor data received from the position sensor 128. For example, the motor controller 102 may determine whether an edge has been detected in the sensor data or otherwise determine whether a pole has been detected by the position sensor 128. An edge (e.g., a rising edge or falling edge) in the sensor data may indicate that a rotor magnet has passed the position sensor 128. This, in turn, indicates that the rotor magnets are aligned with stator poles of the BLDC motor 126. In block 412, the motor controller 102 determines whether a rotor pole has been detected. If so, the method 400 advances to block 418, described below. If a rotor pole has not been detected, the method 400 branches to block 414.

In block 414, the motor controller 102 determines whether a predetermined timeout period has elapsed. If so, the method 400 branches to block 416, in which the motor controller 102 indicates a blocked rotor error condition, and the method 400 stops. The motor controller 102 may cease energizing the motor windings or otherwise power down the BLDC motor 126 to prevent potential damage. After entering the blocked rotor error condition, the method 400 is completed. Referring back to block 414, if the predetermined timeout period has not elapsed, the method 400 loops back to block 408 to continue energizing the motor windings with the current pulse sequence.

Referring back to block 412, if a rotor pole is detected, the method 400 advances to block 418, in which the motor controller 102 switches field direction for the motor windings of the BLDC motor 126. For example, if the motor controller 102 activated the switches 118, 124 while energizing the motor windings, the motor controller 102 may switch to activating the switches 120, 122 while energizing the motor windings. As another example, when controlling a multi-phase motor, the motor controller 102 may activate a different motor phase while energizing the motor windings.

In block 420, the motor controller 102 determines whether the BLDC motor 126 has achieved a predetermined minimum speed. The motor controller 102 may determine the motor speed based on sensor data received from the position sensor 128. If the minimum speed has not been achieved, the method 400 branches to block 422, in which the motor controller 102 adjusts the on/off times of the pulse sequence. The on/off times may be changed to drive the BLDC motor 126 harder or softer, depending on desired startup characteristics. For example, to increase motor speed, the motor controller 102 may increase the duration of each pulse. After adjusting the pulse sequence, the method 400 loops back to block 408 to continue energizing the motor windings with the modified pulse sequence.

Referring back to block 420, if the motor controller 102 determines that the minimum speed has been achieved, the method 400 is completed. As described above, after achieving the predetermined minimum speed, the BLDC motor 126 may be controlled using a closed-loop control method as described below in connection with FIG. 5.

Figure 5:
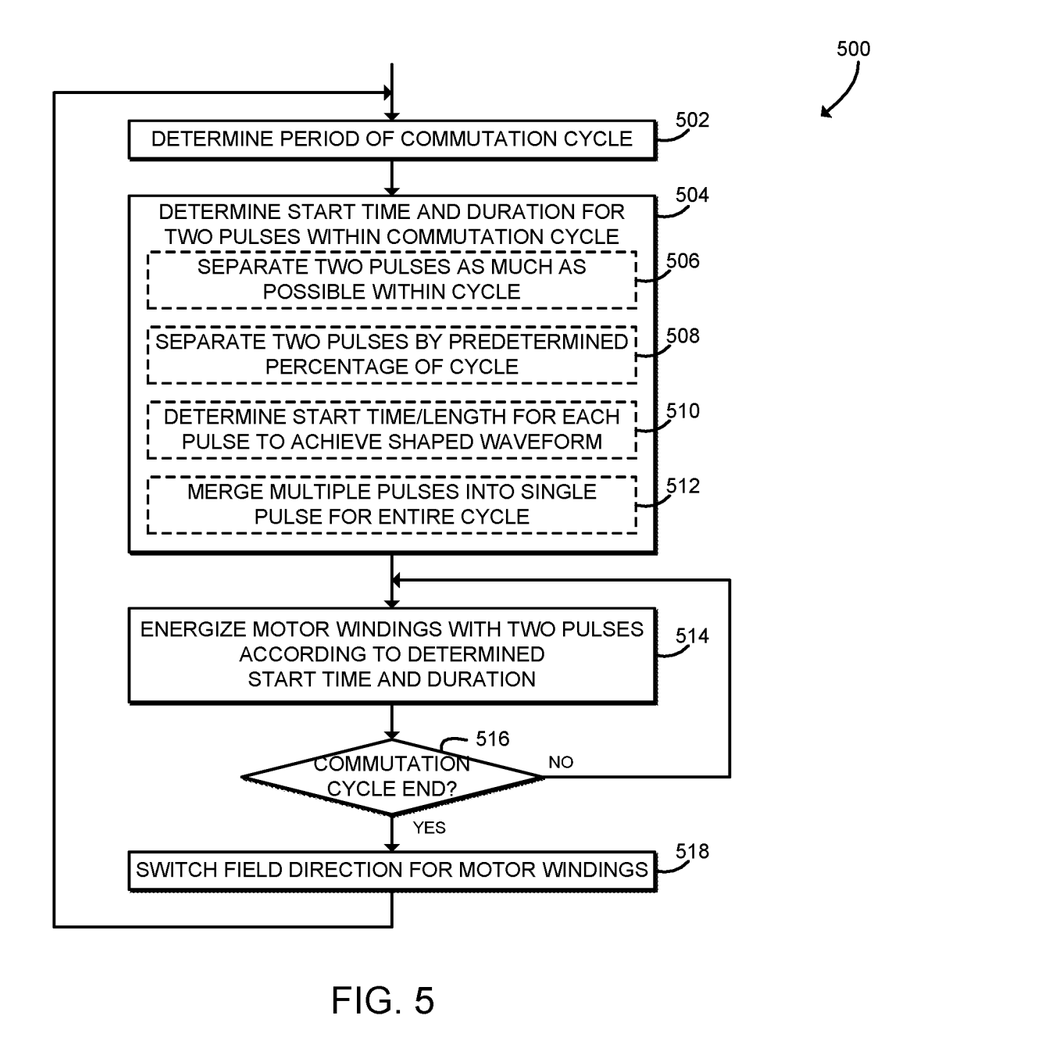
FIG. 5 is a simplified flow diagram of at least one embodiment of a method for closed-loop motor control that may be executed by the motor controller of FIGS. 1-2.

Referring now to FIG. 5, an illustrative embodiment of a method 500 for closed-loop motor control is shown as a simplified flow diagram. The method 500 may be executed by the motor controller 102 (in conjunction with the motor driver 114). The method 500 starts in block 502, in which the motor controller 102 determines the period of a commutation cycle for the BLDC motor 126. The period of the commutation cycle is the time between detection of motor poles using the position sensor 128. For example, for a BLDC motor 126 with a four-pole rotor operating at 1500 revolutions per minute, the period of the commutation cycle is 10 milliseconds. The motor controller 102 may determine the commutation cycle based on sensor data received from the position sensor 128. As described further below, the direction of current in the stator windings of the BLDC motor 126 is switched after every commutation cycle.

In block 504, the motor controller 102 determines a start time and duration for two pulses within the commutation cycle. The start time for each pulse may be determined relative to the commutation cycle (e.g., at a certain number of milliseconds after the start of the commutation cycle, at a percentage of the commutation cycle, etc.). The total duration of the two pulses (i.e., duty cycle) depends on the target motor winding current for the BLDC motor 126, which may be determined as described above in connection with FIG. 3. In some embodiments, a certain part of the commutation cycle may be reserved to allow for current to decay in the motor windings, and the pulses may not extend into the reserved decay time. For example, the last 20% of the commutation cycle may be reserved as decay time.

The motor controller 102 may use any appropriate technique to determine the start time and the duration for each of the two pulses. For example, the two pulses may have the same duration or different durations, and the two pulses may be moved closer or further apart in the commutation cycle to better align a current peak with the most efficient rotor alignment. Adjusting the position of the pulses in the commutation cycle may be used with asymmetric offset coil cores which cog off alignment several degrees (providing more stable Hall sensor 128 readings). Additionally, although illustrated as determining two pulses during the commutation cycle, it should be understood that in some embodiments, the motor controller 102 may determine three pulses during the commutation cycle, or a greater number of pulses during the commutation cycle.

In some embodiments, in block 506 the motor controller may separate the two pulses by as much time as possible within the commutation cycle, with one pulse turning on as early as possible in the commutation cycle and the other pulse turning off as late as possible. For example, one of the pulses may start at the beginning of the commutation cycle. The next pulse may have a start time and duration such that it stops at the beginning of the reserved decay time. Separating the pulses as much as possible may keep the pulse current overlap region near the middle of the commutation cycle as low as possible for increasing power levels. Thus, separating the pulses by as much time as possible within the commutation cycle may maximize efficiency.

In some embodiments, in block 508, the motor controller 102 may separate the two pulses by a predetermined percentage of the commutation cycle. Separating the pulses by a predetermined percentage may simplify firmware and/or hardware of the motor controller 102 as compared to other techniques, such as maximizing time between pulses. In some embodiments, in block 510, the motor controller 102 may determine a start time and duration for each pulse with variable duration and variable spacing to achieve a desired current waveform. In some embodiments, in block 512, the motor controller 102 may merge the pulses into a single pulse. For example, the duration of one pulse may extend beyond the start time of the next pulse. In those embodiments, the merged pulse may be equivalent to pulses generated by single-pulse control or PWM control (e.g., 100% on time except for reserved decay time).

In block 514, the motor controller 102 energizes the windings of the BLDC motor 126 with the two pulses according to the start time and duration determined in block 504. The motor controller 102 may energize the motor windings by operating one or more switches 116 of the motor driver 114 to apply a voltage to the motor windings. For example, the motor controller 102 may close the switches 118, 124 to apply a positive voltage to the BLDC motor 126, and the motor controller 102 may close the switches 120, 122 to apply a negative voltage to the BLDC motor 126. The motor controller 102 may close the appropriate switches according to the start time and duration for each of the two pulses.

In block 516, the motor controller 102 determines whether a commutation cycle has ended. The motor controller 102 may determine whether the commutation cycle has ended based on sensor data received from the position sensor 128. For example, the motor controller 102 may determine whether an edge has been detected in the sensor data or otherwise determine whether a pole has been detected by the position sensor 128. If the commutation cycle has not ended, the method 500 loops back to block 514 to continue energizing the motor windings with the two pulses as described above. If the commutation cycle has ended, the method 500 advances to block 518.

In block 518, the motor controller 102 switches field direction for the motor windings of the BLDC motor 126. For example, if the motor controller 102 activated the switches 118, 124 during the current commutation cycle, the motor controller 102 may activate the switches 120, 122 during the next commutation cycle. As another example, when controlling a multi-phase motor, the motor controller 102 may activate a different motor phase during the next commutation cycle. After switching field direction, the method 500 loops back to block 502 to continue adaptive multi-pulse control of the BLDC motor 126.

Figure 6:
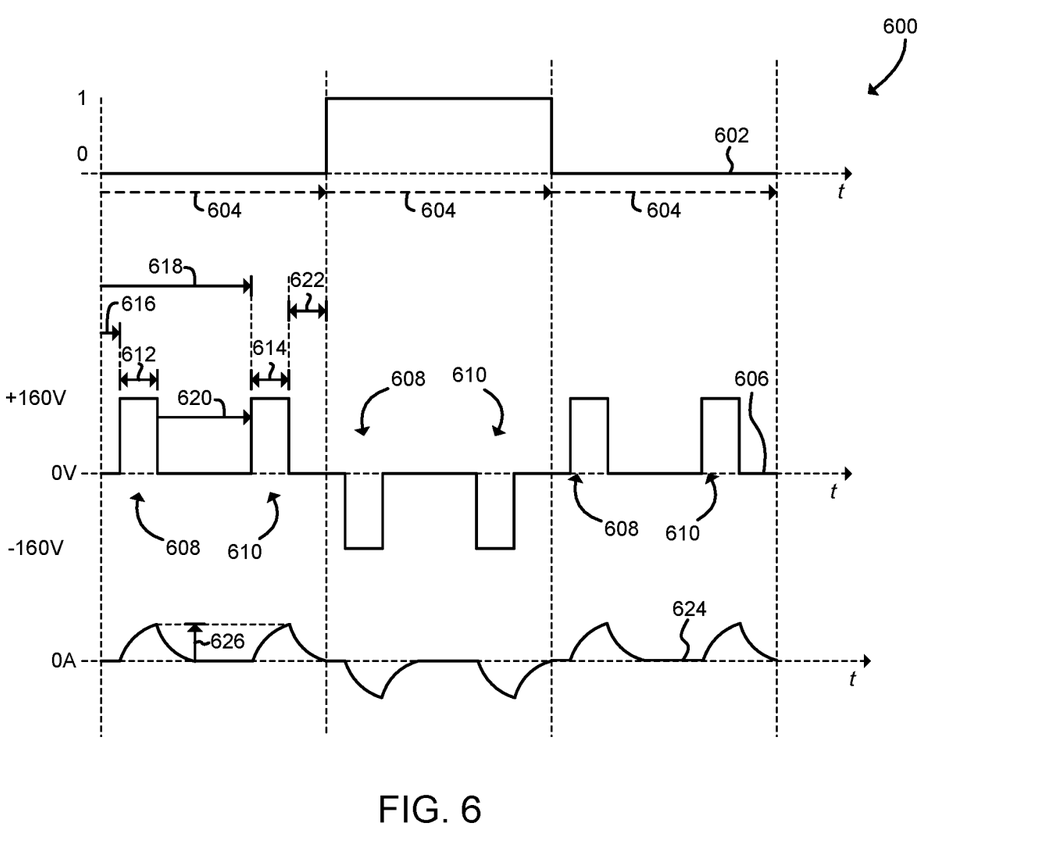
FIG. 6 is a plot illustrating voltage and current waveforms for the system of FIGS. 1-5.

Referring now to FIG. 6, diagram 600 illustrates voltage and current waveforms that may be generated by the system 100 during execution of the methods 400, 500. Curve 602 represents sensor data generated by the Hall effect sensor 128. Curve 602 is illustratively a digital waveform. Edge transitions in the curve 602 represent detections of a rotor pole (e.g., a rotor pole passing the sensor 128). As shown, a commutation cycle 604 extends between each edge of the curve 602.

Curve 606 represents voltages applied to the windings of the BLDC motor 126. As shown, two pulses 608, 610 are applied to the windings during each commutation cycle 604. As shown, the polarity of the pulses 608, 610 is reversed after each commutation cycle 604, for example by switching field direction in the motor windings. Each pulse 608, 610 has a corresponding duration 612, 614 and a corresponding start time 616, 618. A delay time 620 between the pulses 608, 610 is shown. Additionally, a decay time 622 is reserved at the end of each commutation cycle 604.

Illustratively, the pulses 608, 610 are separated by a predetermined percentage of the commutation cycle 604. As described above, in some embodiments the pulses 608, 610 may be separated such that the delay time 620 is maximized. For example, the pulse 608 may start at the beginning of the commutation cycle 604 (e.g., the start time 616 of the pulse 608 may be reduced to zero), and the pulse 610 may end at the beginning of the decay time 622 (e.g., the start time 618 plus the duration 614 plus the decay time 622 equals the period of the commutation cycle 604). FIG. 6 illustrates two separate pulses 608, 610 in each commutation cycle 604. However, it should be understood that in some embodiments, the pulses 608, 610 may merge into a single pulse. Additionally or alternatively, in some embodiments, three or more pulses may be included in each commutation cycle 604. For example, in embodiments with lengthy or indeterminate commutation cycles, such as during startup or at low speeds as described above in connection with FIG. 4, the motor controller 102 may generate a series of pulses 608 that are separated by a delay time 620 until the end of a commutation cycle 604 is detected.

Curve 624 represents current in the motor windings of the BLDC motor 126 resulting from the applied voltage. As shown, the current increases as the pulses 608, 610 are applied to the motor windings and decays after the pulses 608, 610 have stopped. The current reaches a peak current 626 during the commutation cycle 604. As shown, the peak current 626 is lower than the peak current 712 achieved with single-pulse control as shown in FIG. 7. Accordingly, the system 100 may reduce power dissipation and heating associated with higher current as compared to single-pulse motor control. Further, due to the reduced peak current 626, the system 100 may improve efficiency for higher input voltages using the same motor windings. The peak current 626 is higher than the peak current 812 achieved with PWM control as shown in FIG. 8. However, because the switching frequency of the system 100 is much lower than PWM control, the system 100 may reduce switching losses compared to PWM control and thus may be as efficient or more efficient than PWM control, while also reducing potential EMI and audible noise compared to PWM control.

The illustrative diagram 600 shows the current curve 624 decaying back to zero between the pulses 608, 610. In some embodiments, the pulses 608, 610 may be closer together (e.g., the delay time 620 may be reduced) such that current does not decay to zero before the pulse 610 starts. In those embodiments, the peak current 626 may be generated for the pulse 610 and is larger than the peak current generated by the pulse 608. Even in those embodiments, it should be understood that the peak current 626 is less than a corresponding peak current 712 generated through single-pulse control, and thus the system 100 provides reduced power dissipation as compared to single-pulse control.

The following numbered clauses include embodiments that are contemplated and non-limiting:

Clause 1. A motor controller for controlling a brushless direct current motor, the motor controller comprising: a commutation monitor to determine a period of a commutation cycle for the brushless direct current motor.

Clause 2. The motor controller of clause 1, any other suitable clause, or any suitable combination of clauses, further comprising a pulse scheduler to determine a first start time and a first duration for a first pulse and a second start time and a second duration for a second pulse.

Clause 3. The motor controller of clause 2, any other suitable clause, or any suitable combination of clauses, wherein the first start time and the second start time are relative to a start of the commutation cycle.

Clause 4. The motor controller of clause 3, any other suitable clause, or any suitable combination of clauses, further comprising a driver controller to (i) energize a winding of the brushless direct current motor with the first pulse and the second pulse within the commutation cycle.

Clause 5. The motor controller of clause 4, any other suitable clause, or any suitable combination of clauses, wherein the driver controller to (ii) switch a field direction of the winding in response to an end of the commutation cycle.

Clause 6. The motor controller of clause 5, any other suitable clause, or any suitable combination of clauses, wherein to determine the first start time of the first pulse and the second start time of the second pulse comprises to maximize an off time between the first pulse and the second pulse within the commutation cycle.

Clause 7. The motor controller of claim 6, any other suitable clause, or any suitable combination of clauses, wherein to maximize the off time comprises to exclude a predetermined decay time at an end of commutation cycle.

Clause 8. The motor controller of clause 7, any other suitable clause, or any suitable combination of clauses, wherein to determine the first start time of the first pulse and the second start time of the second pulse comprises to separate the first pulse and the second pulse by a predetermined percentage of the commutation cycle.

Clause 9. The motor controller of clause 5, any other suitable clause, or any suitable combination of clauses, wherein to energize the winding of the brushless direct current motor with the first pulse and the second pulse comprises to merge the first pulse and the second pulse.

Clause 10. The motor controller of clause 5, any other suitable clause, or any suitable combination of clauses, wherein to switch the field direction comprises to reverse the field direction of the winding of the brushless direct current motor, wherein the brushless direct current motor comprises a single phase motor.

Clause 11. The motor controller of clause 5, any other suitable clause, or any suitable combination of clauses, wherein to switch the field direction comprises to activate a second winding of the brushless direct current motor, wherein the brushless direct current motor comprises a multi-phase motor.

Clause 12. The motor controller of clause 5, any other suitable clause, or any suitable combination of clauses, wherein to determine the period of the commutation cycle comprises to: receive position data from a position sensor coupled to the brushless direct current motor; and determine a rotational speed of the brushless direct current motor based on the position data.

Clause 13. The motor controller of clause 5, any other suitable clause, or any suitable combination of clauses, further comprising a startup controller to: energize the winding with a pulse having a predetermined length; wait a predetermined time period in response to energizing the winding with the pulse; energize the winding with a pulse having the predetermined length in response to a wait of the predetermined time period; determine whether a rotor pole has been detected based on position data received from a position sensor coupled to the brushless direct current motor; and switch the field direction of the winding in response to a determination that the motor pole has been detected.

Clause 14. The motor controller of clause 13, any other suitable clause, or any suitable combination of clauses, wherein the startup controller is further to: determine a speed of the brushless direct current motor in response to the determination that the motor pole has been detected; determine whether the speed of the brushless direct current motor exceeds a predetermined minimum speed; and increase the predetermined length of the pulse in response to a determination that the speed does not exceed the predetermined minimum speed.

Clause 15. A method for controlling a brushless direct current motor of any other suitable clause or combination of suitable clauses, the method comprising: determining, by a motor controller, a period of a commutation cycle for the brushless direct current motor.

Clause 16. The method of clause 15, any other suitable clause, or any combination of suitable clauses, further comprising determining, by the motor controller, a first start time and a first duration for a first pulse and a second start time and a second duration for a second pulse, wherein the first start time and the second start time are relative to a start of the commutation cycle.

Clause 17. The method of clause 16, any other suitable clause, or any combination of suitable clauses, further comprising energizing, by the motor controller, a winding of the brushless direct current motor with the first pulse and the second pulse within the commutation cycle.

Clause 18. The method of clause 17, any other suitable clause, or any combination of suitable clauses, further comprising switching, by the motor controller, a field direction of the winding in response to an end of the commutation cycle.

Clause 19. The method of clause 18, any other suitable clause, or any suitable combination of clauses, wherein determining the first start time of the first pulse and the second start time of the second pulse comprises maximizing an off time between the first pulse and the second pulse within the commutation cycle.

Clause 20. The method of clause 18, any other suitable clause, or any suitable combination of clauses, wherein determining the first start time of the first pulse and the second start time of the second pulse comprises separating the first pulse and the second pulse by a predetermined percentage of the commutation cycle.

Clause 21. The method of clause 18, any other suitable clause, or any suitable combination of clauses, wherein determining the period of the commutation cycle comprises: receiving position data from a position sensor coupled to the brushless direct current motor; and determining a rotational speed of the brushless direct current motor based on the position data.

Clause 22. The method of clause 18, any other suitable clause, or any suitable combination of clauses, further comprising: energizing, by the motor controller, the winding with a pulse having a predetermined length; waiting, by the motor controller, a predetermined time period in response to energizing the winding with the pulse; energizing, by the motor controller, the winding with a pulse having the predetermined length in response to waiting the predetermined time period; determining, by the motor controller, whether a rotor pole has been detected based on position data received from a position sensor coupled to the brushless direct current motor; and switching, by the motor controller, the field direction of the winding in response to determining that the motor pole has been detected.

Clause 23. One or more non-transitory, computer-readable media comprising a plurality of instructions that in response to being executed cause a motor controller of any other suitable clause or any suitable combination of clauses, to: determine a period of a commutation cycle for a brushless direct current motor; determine a first start time and a first duration for a first pulse and a second start time and a second duration for a second pulse, wherein the first start time and the second start time are relative to a start of the commutation cycle; energize a winding of the brushless direct current motor with the first pulse and the second pulse within the commutation cycle; and switch a field direction of the winding in response to an end of the commutation cycle.

Clause 24. The one or more non-transitory, computer-readable media of clause 23, any other suitable clause, or any suitable combination of clauses, wherein to determine the first start time of the first pulse and the second start time of the second pulse comprises to maximize an off time between the first pulse and the second pulse within the commutation cycle.

Clause 25. The one or more non-transitory, computer-readable media of clause 23, any other suitable clause, or any suitable combination of clauses, wherein to determine the first start time of the first pulse and the second start time of the second pulse comprises to separate the first pulse and the second pulse by a predetermined percentage of the commutation cycle.

Clause 26. The one or more non-transitory, computer-readable media of clause 23, any other suitable clause, or any suitable combination of clauses, wherein to determine the period of the commutation cycle comprises to: receive position data from a position sensor coupled to the brushless direct current motor; and determine a rotational speed of the brushless direct current motor based on the position data.

Clause 27. The one or more non-transitory, computer-readable media of clause 23, any other suitable clause, or any suitable combination of clauses, further comprising a plurality of instructions that in response to being executed cause the motor controller to: energize the winding with a pulse having a predetermined length; wait a predetermined time period in response to energizing the winding with the pulse; energize the winding with a pulse having the predetermined length in response to waiting the predetermined time period; determine whether a rotor pole has been detected based on position data received from a position sensor coupled to the brushless direct current motor; and switch the field direction of the winding in response to determining that the motor pole has been detected.

The invention claimed is:

1. A motor controller for controlling a brushless direct current motor, the motor controller comprising:
   a commutation monitor to determine a period of a commutation cycle for the brushless direct current motor;
   a pulse scheduler to determine a first start time and a first duration for a first pulse and a second start time and a second duration for a second pulse, wherein the first start time and the second start time are relative to a start of the commutation cycle; and
   a driver controller to (i) energize a winding of the brushless direct current motor with the first pulse and the second pulse within the commutation cycle, and (ii) switch a field direction of the winding in response to an end of the commutation cycle.

2. The motor controller of claim 1, wherein to determine the first start time of the first pulse and the second start time of the second pulse comprises to maximize an off time between the first pulse and the second pulse within the commutation cycle.

3. The motor controller of claim 2, wherein to maximize the off time comprises to exclude a predetermined decay time at an end of commutation cycle.

4. The motor controller of claim 1, wherein to determine the first start time of the first pulse and the second start time of the second pulse comprises to separate the first pulse and the second pulse by a predetermined percentage of the commutation cycle.

5. The motor controller of claim 1, wherein to energize the winding of the brushless direct current motor with the first pulse and the second pulse comprises to merge the first pulse and the second pulse.

6. The motor controller of claim 1, wherein to switch the field direction comprises to reverse the field direction of the winding of the brushless direct current motor, wherein the brushless direct current motor comprises a single phase motor.

7. The motor controller of claim 1, wherein to switch the field direction comprises to activate a second winding of the brushless direct current motor, wherein the brushless direct current motor comprises a multi-phase motor.

8. The motor controller of claim 1, wherein to determine the period of the commutation cycle comprises to:
   receive position data from a position sensor coupled to the brushless direct current motor; and
   determine a rotational speed of the brushless direct current motor based on the position data.

9. The motor controller of claim 1, further comprising a startup controller to:
   energize the winding with a pulse having a predetermined length;
   wait a predetermined time period in response to energizing the winding with the pulse;
   energize the winding with a pulse having the predetermined length in response to a wait of the predetermined time period;
   determine whether a rotor pole has been detected based on position data received from a position sensor coupled to the brushless direct current motor; and
   switch the field direction of the winding in response to a determination that the motor pole has been detected.

10. The motor controller of claim 9, wherein the startup controller is further to:
    determine a speed of the brushless direct current motor in response to the determination that the motor pole has been detected;
    determine whether the speed of the brushless direct current motor exceeds a predetermined minimum speed; and
    increase the predetermined length of the pulse in response to a determination that the speed does not exceed the predetermined minimum speed.

11. A method for controlling a brushless direct current motor, the method comprising:
    determining, by a motor controller, a period of a commutation cycle for the brushless direct current motor;
    determining, by the motor controller, a first start time and a first duration for a first pulse and a second start time and a second duration for a second pulse, wherein the first start time and the second start time are relative to a start of the commutation cycle;

energizing, by the motor controller, a winding of the brushless direct current motor with the first pulse and the second pulse within the commutation cycle; and switching, by the motor controller, a field direction of the winding in response to an end of the commutation cycle.

12. The method of claim 11, wherein determining the first start time of the first pulse and the second start time of the second pulse comprises maximizing an off time between the first pulse and the second pulse within the commutation cycle.

13. The method of claim 11, wherein determining the first start time of the first pulse and the second start time of the second pulse comprises separating the first pulse and the second pulse by a predetermined percentage of the commutation cycle.

14. The method of claim 11, wherein determining the period of the commutation cycle comprises:
receiving position data from a position sensor coupled to the brushless direct current motor; and
determining a rotational speed of the brushless direct current motor based on the position data.

15. The method of claim 11, further comprising:
energizing, by the motor controller, the winding with a pulse having a predetermined length;
waiting, by the motor controller, a predetermined time period in response to energizing the winding with the pulse;
energizing, by the motor controller, the winding with a pulse having the predetermined length in response to waiting the predetermined time period;
determining, by the motor controller, whether a rotor pole has been detected based on position data received from a position sensor coupled to the brushless direct current motor; and
switching, by the motor controller, the field direction of the winding in response to determining that the motor pole has been detected.

16. One or more non-transitory, computer-readable media comprising a plurality of instructions that in response to being executed cause a motor controller to:
determine a period of a commutation cycle for a brushless direct current motor;
determine a first start time and a first duration for a first pulse and a second start time and a second duration for a second pulse, wherein the first start time and the second start time are relative to a start of the commutation cycle;
energize a winding of the brushless direct current motor with the first pulse and the second pulse within the commutation cycle; and
switch a field direction of the winding in response to an end of the commutation cycle.

17. The one or more non-transitory, computer-readable media of claim 16, wherein to determine the first start time of the first pulse and the second start time of the second pulse comprises to maximize an off time between the first pulse and the second pulse within the commutation cycle.

18. The one or more non-transitory, computer-readable media of claim 16, wherein to determine the first start time of the first pulse and the second start time of the second pulse comprises to separate the first pulse and the second pulse by a predetermined percentage of the commutation cycle.

19. The one or more non-transitory, computer-readable media of claim 16, wherein to determine the period of the commutation cycle comprises to:
receive position data from a position sensor coupled to the brushless direct current motor; and
determine a rotational speed of the brushless direct current motor based on the position data.

20. The one or more non-transitory, computer-readable media of claim 16, further comprising a plurality of instructions that in response to being executed cause the motor controller to:
energize the winding with a pulse having a predetermined length;
wait a predetermined time period in response to energizing the winding with the pulse;
energize the winding with a pulse having the predetermined length in response to waiting the predetermined time period;
determine whether a rotor pole has been detected based on position data received from a position sensor coupled to the brushless direct current motor; and
switch the field direction of the winding in response to determining that the motor pole has been detected.

* * * * *